United States Patent [19]

Tibbs

[11] 4,007,527
[45] Feb. 15, 1977

[54] UTENSIL RETAINING MEANS

[76] Inventor: Edward A. Tibbs, 59 Townsend Ave., Newburgh, N.Y. 12550

[22] Filed: July 7, 1975

[21] Appl. No.: 593,577

[52] U.S. Cl. .................................. 30/327; 248/37.3
[51] Int. Cl.² .................................. A47J 43/28
[58] Field of Search .................. 15/145–147 A, 15/246; 16/110 R, 114 R, 115, DIG. 41; 30/327; 81/177 A, 177 G; 248/37.3, 110, 111

[56] References Cited

UNITED STATES PATENTS

| 512,345 | 1/1894 | Weissenborn | 15/146 X |
| 614,255 | 11/1898 | McChesney | 81/177 A X |
| 1,771,207 | 7/1930 | Coscioni | 16/115 |
| 3,149,824 | 9/1964 | Albano | 30/327 X |

Primary Examiner—Al Lawrence Smith
Assistant Examiner—James G. Smith
Attorney, Agent, or Firm—Ronald S. Cornell

[57] ABSTRACT

A utensil retaining device for supporting a utensil against slipping into a cooking vessel. The retaining device comprises an elongated, hollow member with an open end to receive the utensil handle and a closed end with a hook to engage the rim of the cooking vessel.

9 Claims, 4 Drawing Figures

U.S. Patent  Feb. 15, 1977  4,007,527
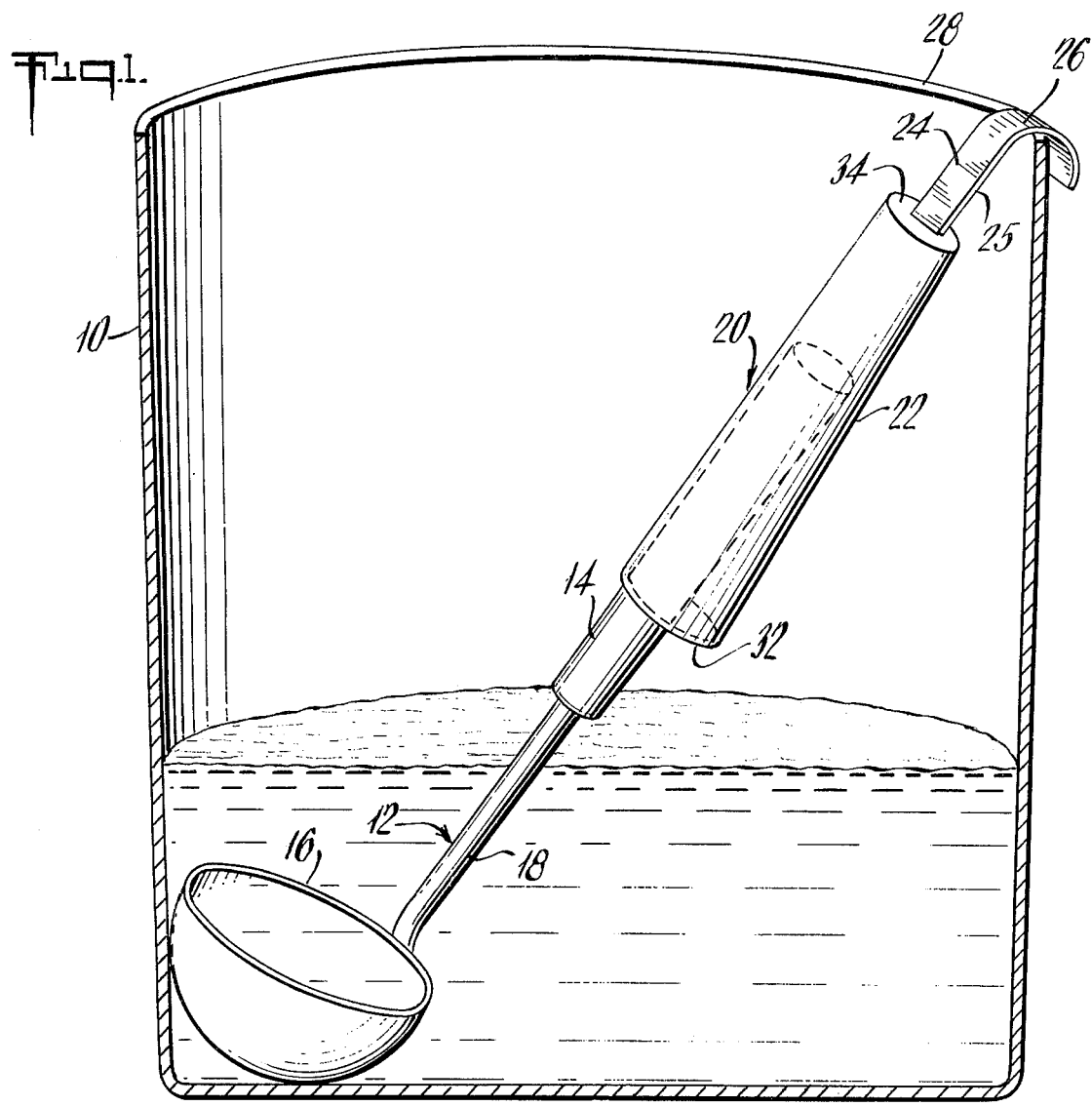
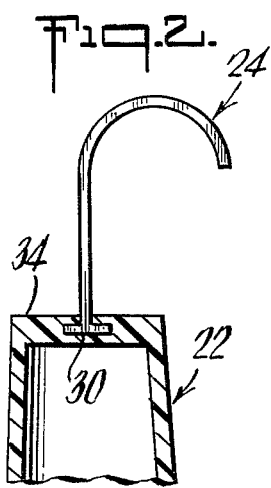 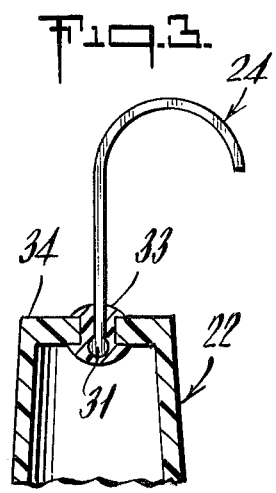 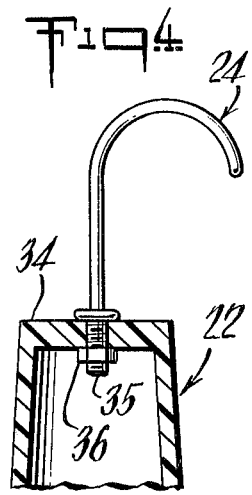

UTENSIL RETAINING MEANS

This invention relates to a utensil holding means for preventing the utensil from slipping into the contents of a cooking vessel. More particularly, the invention relates to a device adapted to act as an extention for the handle of a spoon or ladle so that such utensil can be allowed to remain in the cooking vessel when not in use, but wherein the utensil is prevented from falling into the material in the cooking vessel by means adapted to engage the upper periphery thereof.

It is often necessary while cooking to periodically stir the material being cooked. Quite often it will be desirable to use both hands for other purposes, or it may be necessary to leave the vicinity of the cooking vessel in order to obtain additional materials to add thereto or for various other purposes. At such times it is, of course, undesirable for the cook to carry the utensil or to place it on the stove top or adjacent countertop since it will almost always drip or leave a residue of the material being cooked where it is placed. In addition, it is quite possible that foreign substances will be transferred into the food. While it would be desirable to leave the stirring implement in the cooking vessel it is commonly impossible to do so without the utensil falling into the material being cooked.

It is an object of the present invention to provide a handle extension means with a rim engaging hook at the outer end thereof, said means being adapted to keep the mixing utensil from sliding into the material in the pot.

Another object of the invention is to provide a simple handle extension means of the type described herein and in which said handle extension means is adapted to remain either on the handle during use or separated from the handle during such use in accordance with the preference of the user.

A still further object of the invention is to provide a handle extension means which maintains a loose association with the cooking vessel whereby it will be readily removable therefrom, yet which device will still be capable of keeping the utensil from submerging into the food.

In accordance with the invention there is provided a handle extension means for a spoon, ladle or other mixing utensil, said extension means having at the outer end thereof a hooked rim-engaging retaining means adapted to engage the rim of a cooking vessel, and said extension means being telescopically slidable over the handle of said utensil whereby the length of the handle can be extended to approximately double its ordinary length.

The invention further resides in certain novel features of the construction and in the combination and arrangement of parts of the apparatus in which the invention is embodied; and further objects and advantages of the invention will be apparent to those skilled in the art to which the invention pertains from the following description of the present preferred embodiments thereof described with reference to the accompanying drawings in which:

FIG. 1 shows, in partial section, a cooking vessel 10 in which there rests a ladle 12 having a handle 14 attached to the liquid holding and stirring means 16 through connecting means 18. The ladle is shown with the liquid holding means 16 resting in a lower corner of the cooking utensil. It will be apparent that under normal circumstances the ladle handle 14 would fall into the liquid in said cooking utensil but that such effect is prevented through the use of the handle extension means generally designated by numeral 20.

It will be seen that handle extension means 20 is comprised of a rim engaging retaining means 24 and a hollow frusto-conical section 22 having a lower, open, wide end 32 and an upper, closed, narrow end 34. Frusto-conical section 22 is designed to slidably and telescopically engage handle 14 within its hollow interior. Rim-engaging retaining means 24 includes a straight portion 25 and a curvilinear section 26 which is adapted to engage the upper rim 28 of the cooking vessel 10.

The frusto-conical section 22 of the handle extension device 20 will desirably be formed from a heat and moisture resistant hard rubber or plastic material such as a urea-formaldehyde resin or a phenol-formaldehyde resin. It will be molded in such a shape as to permit the entry of any of the handles such as are normally provided on kitchen mixing implements. Retaining means 24 may also be formed of any suitable material and is preferably made from stainless steel or aluminum. It may also, however, be formed from a suitable hear-resistant hard rubber or plastic material such as phenol-formaldehyde.

Retaining means 24 can be secured to frusto-conical section 22 by any suitable means various such means being shown in FIGS. 2, 3, and 4. Generally said retaining means will be passed through small aperture in the upper end of said frusto-conical section 22 and there be fastened as for example by a threaded fastener, a plastic mass, etc.

In a preferred embodiment, of the invention shown in FIG. 2 the frusto-conical section 22 is molded around an expanded end 30 of retaining means 24.

In another embodiment of the invention shown in FIG. 3 the end 31 of retaining means 24 is slightly enlarged and is secured to end 34 of the frusto-conical section 22 with a mass 33 which may be a thermoplastic material, or a reactive plastic such as an epoxy resin, or the like.

In yet another embodiment of the invention shown in FIG. 4 the end 35 of means 24 is threaded and secured by means of a nut 36.

The handle extension means includes the frusto-conical section 22 having a smaller diameter at the hook retaining end thereof and a lower somewhat wider open end adapted to receive the handle of the mixing utensil. In a preferred embodiment the smaller closed end of the frusto-conical section 22 will be approximately ¾ of an inch in diameter and the lower, open end will approximate 1 inch in diameter. The total length of the frusto-conical section in this preferred embodiment approximates 4 inches. In this preferred embodiment the retaining means 24 is formed of a thin stainless steel having a width of approximately ¼ inch, and is attached to frusto-conical section 22 in the manner shown in FIG. 3 and described hereinabove.

In order to illustrate the invention FIG. 1 has shown a ladle as the mixing device. It will be obvious, however, that the handle extension means is equally useful with other cooking implements, such as spoons, forks, and mixing paddles.

The above invention has been described with reference to certain embodiments thereof. It will be obvious to those skilled in the art who read this specification that other variations and modifications of the invention can be made and various equivalents substituted therein without departing from the principles disclosed or going outside the scope of the specification or purview of the claims.

Having thus described the invention, I claim:

1. In combination, a utensil having a handle and means for supporting said utensil within a cooking vessel, said means for supporting said utensil comprising an elongated hollow means having one open end, said hollow means loosely encompassing said handle, and hook means on said means for supporting said utensil, said hook means being adapted to engage the rim of said cooking vessel.

2. The combination of claim 1 wherein said elongated hollow means is in the shape of a frusto-conical section.

3. The combination of claim 2 wherein said means for engaging the rim of said cooking vessel is attached to the smaller end of said frusto-conical section.

4. The combination of claim 1 wherein said rim engaging means includes a straight portion and a curvilinear portion, said straight portion being secured to said elongated hollow means.

5. The combination of claim 4 wherein said rim engaging means is secured to said elongated hollow means at an end thereof remote from said open end.

6. The combination of claim 5 wherein said rim engaging means is secured to said elongated hollow means by a hardened plastic mass.

7. The combination of claim 5 wherein one end of said rim engaging means is threaded and is secured to said elongated hollow means by means of a nut.

8. The combination of claim 5 wherein said elongated hollow means is molded around one end of said rim engaging means.

9. The combination of claim 1 wherein said elongated hollow means is adapted to slide telescopically around the handle of said utensil.

* * * * *